United States Patent
Fisher et al.

(10) Patent No.: US 6,463,545 B1
(45) Date of Patent: Oct. 8, 2002

(54) BATTERY CALIBRATION SYSTEM FOR DISCHARGING A RECHARGEABLE BATTERY AND GENERATING AN AC DETECT SIGNAL TO POWER MANAGEMENT LOGIC TO MAINTAIN NORMAL COMPUTER OPERATION EVEN WHEN BATTERY IS BELOW CERTAIN LEVEL

(75) Inventors: Andrew J. Fisher, Spring; Steven D. Holehan, Magnolia; Jonathan E. James; Jon H. Liu, both of Houston; Thomas T. Pham, Cypress; Donald G. Scharnberg, Pasadena, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/411,796

(22) Filed: Oct. 1, 1999

(51) Int. Cl.[7] .............................. G06F 1/28; G06F 1/30; G06F 1/26
(52) U.S. Cl. .................. 713/340; 713/300; 713/320; 713/330
(58) Field of Search ................... 713/300, 320, 713/330, 340

(56) References Cited

U.S. PATENT DOCUMENTS

| 5,184,025 | A | * | 2/1993 | McCurry et al. | 307/66 |
| 5,689,412 | A | * | 11/1997 | Chen | 363/125 |
| 5,867,007 | A | * | 2/1999 | Kim | 320/118 |
| 6,049,193 | A | * | 4/2000 | Chien | 320/123 |
| 6,115,822 | A | * | 9/2000 | Kim et al. | 713/310 |

OTHER PUBLICATIONS

The I²C–Bus And How To Use It (including specifications), Philips Semiconductors, Apr. 1995, pp. 1–14.

* cited by examiner

Primary Examiner—Thomas Lee
Assistant Examiner—Nitin C. Patel
(74) Attorney, Agent, or Firm—Conley, Rose & Tayon, P.C.

(57) ABSTRACT

A laptop computer system executes automatic battery calibration to improve the accuracy of the battery's internal charge monitor. The calibration procedure drains the battery to approximately 0% of charge capacity during normal computer operation, permitting a user to operate the computer without risking power failure when the battery discharges. The computer returns to normal operation if either the AC power or the battery is removed. During the calibration procedure, the computer system prevents power management software from forcing shut down before the battery completely drains.

19 Claims, 5 Drawing Sheets

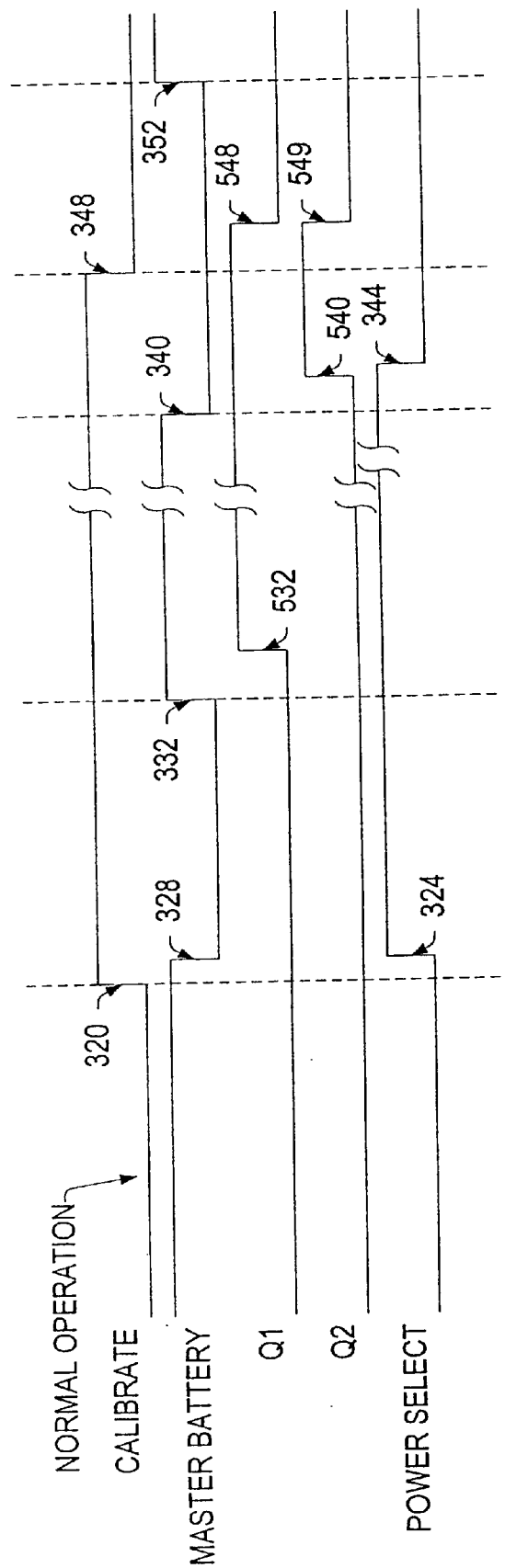

BATTERY CALIBRATION SYSTEM FOR DISCHARGING A RECHARGEABLE BATTERY AND GENERATING AN AC DETECT SIGNAL TO POWER MANAGEMENT LOGIC TO MAINTAIN NORMAL COMPUTER OPERATION EVEN WHEN BATTERY IS BELOW CERTAIN LEVEL

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to portable computers and particularly to battery operated portable computers. More particularly, the present invention relates to automatically calibrating batteries in portable computers.

BACKGROUND OF THE INVENTION

Effective battery design has been at the forefront of computer systems development in recent years. Batteries store electric charge, which is gradually released to power the computer circuitry. Laptop computers in particular are designed to operate on battery power, allowing the computer to be used in virtually any location. Because the user is limited to a finite number of hours of computing time before the battery runs out, a longer lasting battery generally provides the user with a more fulfilling and productive experience. The exact amount of operating time that a battery provides depends on a number of factors, including the charge storage capacity of the battery, the operating speed of the computer, and the number of transistors in the computer. Higher operating speeds and more transistors, which generally permit higher performance, generally draw more power. Thus, power requirements continue to increase as computer manufacturers strive to improve performance, increasing the demand for higher battery capacity. Increasing battery storage capacity usually increases the size and weight of the battery, however, and large, heavy batteries are not feasible for laptop computers due to inherent size and weight restrictions.

Manufacturers have employed a variety of techniques to extend battery operating time, including modifications to computer hardware, special power-saving software algorithms, and improvements in battery technology. Many computer components, especially in laptop computers, are designed to shut down after a period of inactivity, even while the rest of the computer continues to operate. The display screen, for example, may darken or turn off if the user fails to type on the keyboard or move the mouse after a predetermined period of time. Similarly, the disk drive may shut off if not accessed for a period of time. Many computer systems are capable of entering a special "sleep" mode in which virtually the entire computer shuts down, including the central processing unit (CPU), although the memory contents are retained so that the computer can return to normal operation within a few seconds. Older computers relied on instructions stored in the computer hardware known as the Advanced Power Management (APM) to determine when to shut down selected components. Newer computer designs which conform to the Advanced Configuration and Power Interface (ACPI) standard, developed by Intel, Microsoft, and Toshiba, rely on the operating system (e.g., Windows 98) software to turn individual components on and off. Power control, through either hardware or software, extends the battery life by drawing power only as needed.

Recent improvements in battery design have extended battery life, as well. Previously, battery voltage would gradually decrease as the charge drained, eventually dropping below the required operating voltage of the computer. Although some electric charge would remain, these batteries could not regain the required operating voltage without being recharged. Newer by contrast, tend to remain at the required operating voltage until the charge is almost completely gone. When the battery output voltage drops below the desired operating voltage, modem computers typically have about four to eight seconds of operation time left before power completely vanishes, terminating computer operation. Thus, modem batteries last longer by operating more efficiently.

In order to prevent the computer from suddenly shutting down due to a drained battery, possibly resulting in data loss, computer software continuously tracks the battery level and notifies the user of the remaining battery power. Some computers, upon nearing complete discharge, prevent data loss by automatically saving the memory contents to disk and then shutting the computer down. The user then must recharge the battery, insert another computer battery, or plug the computer into a wall socket to resume computing.

Accordingly, it is desirable to know how much battery charge remains. Typically, the amount of remaining charge is determined by continuously measuring battery output current, beginning after the battery is recharged. Because the exact amount of charge after recharging is difficult to measure accurately, the battery monitor assumes that the battery charges to full capacity after each recharge, where the capacity represents the highest theoretical level of charge that the battery can store. The remaining battery level then is determined by subtracting the spent charge from the total battery charge capacity.

Because of the nature of battery chemistry, however, accurately determining the amount of charge stored in the battery after recharging can prove difficult. Many rechargeable batteries exhibit a phenomenon known as the "memory effect," in which the battery cannot charge to full capacity unless first being completely discharged. If a battery is discharged to 90% of its initial charge level and then recharged, for example, then recharging the battery will not succeed in filling the battery to 100% of its charge capacity. Instead, the battery will stop recharging before reaching full capacity. Repeated charge/discharge cycles enhance the memory effect, causing the battery to reach successively lower levels of charge after each recharge. Whenever the memory effect prevents the battery from charging to capacity, the battery monitor reflects a higher level of charge than the battery actually stores. The memory effect thus can reduce the accuracy of a battery monitor by increasing the difference between the battery capacity and the actual charge level after recharging. Accordingly, the battery monitor may indicate that there is charge remaining when the battery reaches complete discharge. If the computer fails to save the contents of memory before the battery actually discharges, then data loss may occur.

To compensate for the battery monitor inaccuracy, the computer typically saves memory and shuts down when the charge level falls below a predetermined cutoff point. The cutoff point, which typically represents a percentage of the total battery capacity, is set sufficiently high to prevent unexpected loss of power. Though effective in preventing unexpected shut down, this early shut down technique reduces the amount of operating time for the user. In addition, because the battery never reaches complete discharge, the memory effect circumvents accurate measurement of the charge level by preventing the battery from fully recharging again. For this reason, batteries often must be calibrated by completely charging and then discharging the battery. After recharging the battery from a complete discharge, the battery can store the full charge capacity, and battery charge level measurements can be made accurately.

Discharging the battery, however, can be challenging and inconvenient for many users. Discharging the battery typically requires idling the computer for long periods, waiting for the battery to drain. While waiting for the battery to drain, the user may use the computer, although not without risking data loss when battery discharge causes the computer to shut down. In addition, many users experience difficulty when built-in power management features interfere with the discharging procedure. As explained above, for instance, some power management features force the computer to shut down before the battery completely drains, preventing the battery from fully recharging. Other power management features emit warning beeps or other indicators when the battery is nearly drained. Many inexperienced users turn the computer off, believing the beep indicates that the battery has fully drained. Further, some users procrastinate or avoid battery calibration altogether, exacerbating the calibration problem.

For the foregoing reasons, a computer system capable of automatically calibrating the battery, with little or no user intervention, would greatly improve mobile computing. Such an apparatus, if devised, should operate without interfering with the user experience. Despite the apparent advantages that such a system would provide, no device to date provides these features.

SUMMARY OF THE INVENTION

Accordingly, the present invention discloses a computer system with a rechargeable battery, the computer system capable of executing battery calibration to improve the accuracy of the battery's internal charge monitor. The calibration procedure drains the battery until the battery is nearly discharged, or until the battery reaches approximately 0% of charge capacity. The calibration occurs during normal computer operation, permitting a user to operate the computer without risking power failure when the battery discharges. The computer returns to normal operation if either the AC power or the battery is removed. During the calibration procedure, the computer system prevents power management software from forcing shut down before the battery completely drains.

A preferred embodiment of the computer system includes a power supply that supplies direct current (DC) power to the computer from an alternating current (AC) source and a rechargeable battery that supplies DC power to the computer. The battery supplies power directly to a power supply rail in the system, and the power supply delivers power to the system power rail through a switch. If the switch is opened, decoupling the power rail from the power supply, then the computer operates from battery power. The power supply generates an AC detect signal which indicates that the power supply is converting AC to DC, even if the switch is opened, preventing DC current flow from the power supply into the computer. The AC detect signal thus indicates when the power supply is operating and capable of powering the computer. The battery generates a master battery status signal while supplying current to power the computer. If additional batteries are included, then only the battery actively powering the computer asserts the master battery signal. The AC detect signal preferably couples to the master battery signal via a switch. If the switch is closed, then the AC detect signal asserts the master battery signal.

A preferred embodiment includes a power management bus bridge or other logic device that manages power control functions in conjunction with a software-based power control protocol, such as ACPI or APM; a state machine that operates the switch coupling the power supply to the computer; and an input/output controller coupled to the battery and to the power management logic. The state machine receives a calibrate signal from the power management logic. As long as the calibrate signal remains deasserted, the state machine holds the switch coupling the power supply to the system power rail closed, permitting current flow from the power supply to the computer. When the calibrate signal is asserted, the state machine opens the switch coupling the power supply to the computer. Asserting the calibrate signal also opens the switch coupling the AC detect signal to the master battery signal. The input/output controller detects when the master battery signal drops and commands the battery to begin powering the system. In response, the battery asserts the master battery signal and begins providing operating current to the computer.

While feeding on battery power during calibration, the computer may operate normally. Because the AC detect signal is asserted during calibration, power management software does not force the computer to shut down when the battery charge falls below the usual shut down charge threshold. Accordingly, the battery is allowed to discharge nearly completely. If the battery is removed, or if the battery drops the master battery signal, indicating that the battery is nearly drained, then the state machine closes the switch to reconnect the power supply to the computer system, thus providing continuous power to the computer and preventing shut down. The master battery signal serves as a timing signal to the state machine, so that the state machine actuates the switch asynchronously, or immediately in response to the master battery signal. The computer thus begins operating on current from the power supply when the master battery signal drops, without suffering power failure. Because the battery nearly completely discharges, the battery subsequently can be recharged to full capacity, restoring the accuracy of the battery monitor.

The input/output controller also monitors the state of the master battery signal. When the master battery signal drops, the input/output controller generates a system management interrupt to the power management logic. The power management logic releases the calibrate signal in response to the interrupt, recoupling the AC detect signal to the master battery signal. The AC detect signal thus pulls the master battery signal high.

Thus, the present invention comprises a combination of features and advantages that enable it to substantially advance the art by providing a computer system capable of automatically calibrating an internal, rechargeable battery without risking shut down due to power failure, thus permitting normal computer use during calibration, extended operation time, and higher battery monitor accuracy. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of preferred embodiments is considered in conjunction with the following drawings, in which:

FIG. 5 illustrates a preferred embodiment of the timing diagram of the operation of the calibration logic of FIG. 4, during the automatic battery calibration of FIG. 3.

DETAILED DESCRIPTION OF THE PREFERRED EMBODIMENTS

Figure 1:
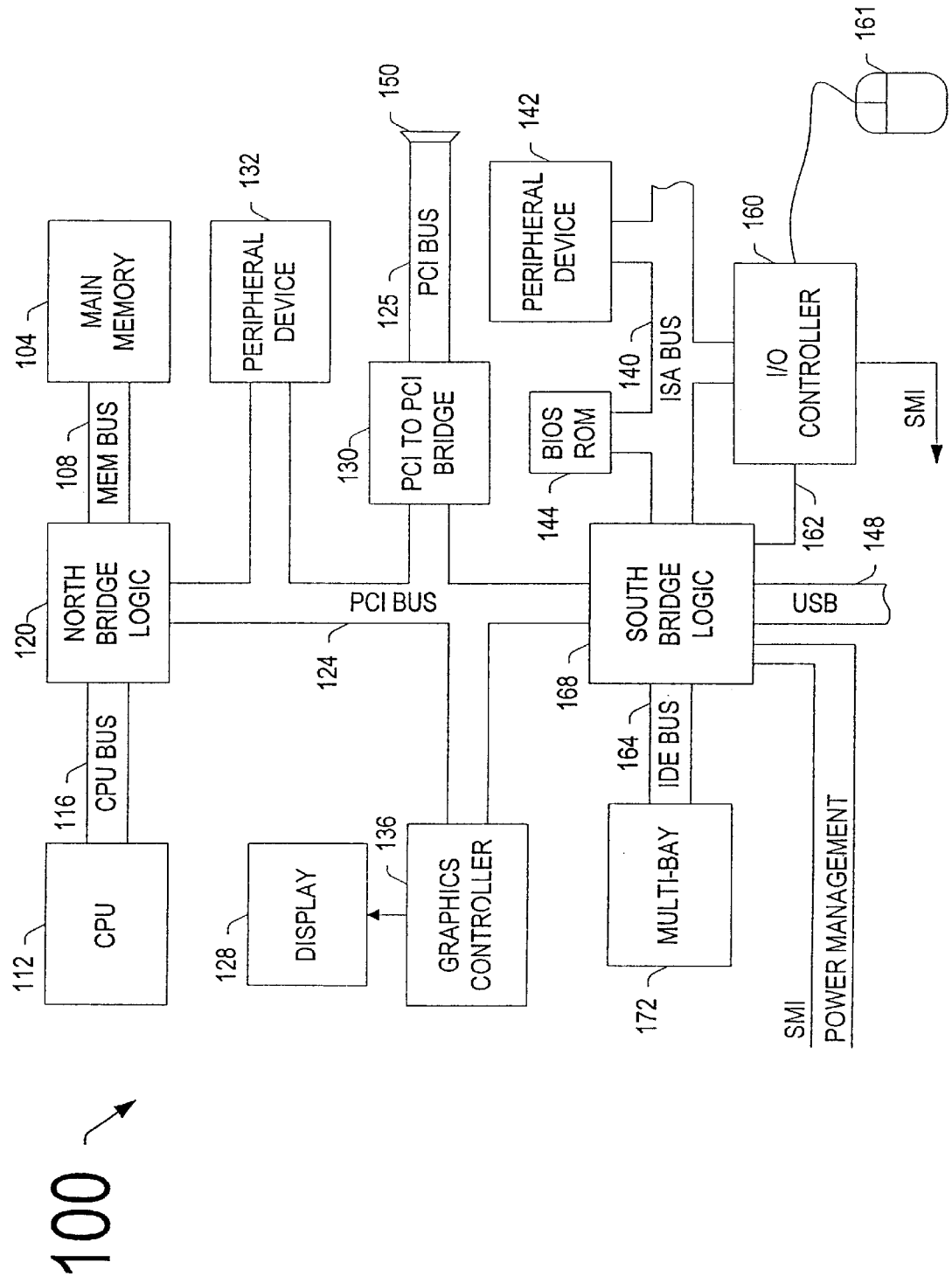
FIG. 1 illustrates a computer system constructed in accordance with a preferred embodiment.

FIG. 1 illustrates a laptop computer system 100 constructed in accordance with a preferred embodiment. The following discussion, however, should not be construed as limiting the present invention to a laptop. The present invention also may be used with a desktop system, work station, server, handheld computer, or any other battery operated electronic computing device, such as a cellular telephone. Computer system 100 generally comprises a microprocessor or CPU 112 coupled to a main memory array 104 and a variety of other peripheral computer system components through an integrated North bridge logic device 120. The bridge logic device 120 is sometimes referred to as a "North bridge" for no other reason than it often is depicted at the upper end of a computer system drawing. The CPU 112 preferably couples to bridge logic 120 via a CPU bus 116, or the bridge logic 120 may be integrated into the CPU 112. The CPU 112 may comprise, for example, a Pentium® III microprocessor. It should be understood, however, that computer system 100 could include other alternative types of microprocessors. Further, an embodiment of computer system 100 may include multiple processors, with each processor coupled through the CPU bus 116 to the bridge logic unit 120. Each processor preferably includes an internal cache memory, although an cache may optionally be attached to the CPU bus 116 or directly to the CPU 112 as a "backside" cache.

The main memory array 104 preferably couples to the bridge logic unit 120 through a memory bus 108, and the bridge logic 120 preferably includes a memory control unit (not shown) that controls transactions to the main memory 104 by asserting the necessary control signals during memory accesses. The main memory 104 functions as the working memory for the CPU 112 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The computer system 100 also preferably includes a graphics controller 136 that couples to the bridge logic 120 via an expansion bus 124. As shown in FIG. 1, the expansion bus 124 comprises a Peripheral Component Interconnect (PCI) bus. Alternatively, the graphics controller 136 may couple to bridge logic 120 through an additional Advanced Graphics Port (AGP) bus (not specifically shown). As one skilled in the art will understand, the graphics controller 136 controls the rendering of text and images on a display device 128. The graphics controller 136 may embody a typical graphics accelerator generally known in the art to render threedimensional data structures on display 128. These data structures can be effectively shifted into and out of main memory 104 via the expansion bus and bridge logic 120. The graphics controller 136 therefore may obtain mastership of the expansion bus (including either PCI or AGP bus), enabling the graphics controller 136 to request and receive access to a target interface within the bridge logic unit 120, including the memory control unit. This mastership capability permits the graphics controller 136 to access main memory 104 without the assistance of the CPU 112. A dedicated graphics bus accommodates rapid retrieval of data from main memory 104. As will be apparent to one skilled in the art, the bridge logic 120 includes a PCI interface to permit master cycles to be transmitted and received by bridge logic 120. If an AGP bus is included in the system, the bridge logic 120 also includes an interface for initiating and receiving cycles to and from components on the AGP bus. The display 128 comprises any suitable electronic display device upon which an image or text can be represented. A suitable display device may include, for example, a cathode ray tube (CRT), a liquid crystal display (LCD), a thin film transistor (TFT), a virtual retinal display (VRD), or any other type of suitable display device for a computer system.

In the preferred embodiment as shown in FIG. 1, the expansion bus 124 comprises a Peripheral Component Interconnect (PCI) bus. Computer system 100, however, is not limited to any particular type of expansion bus, and thus various buses may be used, including a high speed (66 MHz or faster) PCI bus. In the preferred embodiment, any number of PCI peripheral devices 132 may reside on the PCI bus 124, including devices such as, for example, network interface cards (NIC's), video accelerators, audio cards, hard or floppy disk drives, Personal Computer Memory Card International Association (PCMCIA) drives, Small Computer Systems Interface (SCSI) adapters and telephony cards.

In addition and as mentioned above, computer system 100 can be implemented with respect to the particular bus architectures shown in FIG. 1 (i.e., PCI bus), or other bus architectures (i.e., IEEE 1394), as desired. Further, because CPU 112 preferably comprises a Pentium® III processor, the CPU bus 116 represents a Pentium® III bus. These bus protocols and the terminology used with respect to these protocols are well known to those of ordinary skill in the art. For a more thorough understanding of the PCI bus, refer to the *PCI Local Bus Specification* (1993). If an AGP bus also is used in the computer system, reference may be made to the *Accelerated Graphics Port Interface Specification* (Intel, 1996).

The computer system also includes a bus bridge 130 for coupling the expansion bus within the computer to an expansion bus housed in a docking station. The bus bridge 130 couples to a secondary PCI bus 125, which terminates at a docking connector 150. Because the buses 124 and 125 preferably represent PCI buses, the bus bridge 130 represents a PCI-to-PCI bus bridge. An exemplary PCI-to-PCI bridge device is the 21554 PCI-to-PCI bridge manufactured by Intel Corporation. In addition to the PCI signals that are provided between the computer 100 and the docking connector 150, various "sideband" signals within the docking station 150 may be connected to the computer system 100 via the docking connector 150. Examples of sideband signals include power and ground signals, interrupt signals, and I/O signals such as serial and parallel port signals, keyboard and mouse signals, and audio and video signals.

Referring still to FIG. 1, a secondary bridge logic device 168 preferably connects to expansion bus 124. The secondary bridge logic is sometimes referred to as a "South bridge," reflecting its location vis-a-vis the North bridge in a typical computer system drawing. The South bridge 168 couples or "bridges" the primary expansion bus 124 to other secondary expansion buses. These other secondary expansion buses may include an ISA (Industry Standard Architecture) bus, a sub-ISA bus, a USB (Universal Serial Bus), an IDE bus, an IEEE 1394 standard (or "FireWire") bus, or any of a variety of other buses that are available or may become available in the future. In the preferred embodiment of FIG. 1, the South bridge logic 168 couples to a sub-ISA bus 140, a USB bus 148, and an IDE bus 164. As will be apparent to one skilled in this art, various peripheral devices may be coupled to each of these buses. Thus, as shown in the preferred embodiment of FIG. 1, an I/O controller chip 160 connects to the sub-ISA bus 140, as do a BIOS ROM 144 and various other ISA-compatible devices 142.

The I/O controller 160 preferably interfaces various input devices, including a mouse 161, a keyboard, a floppy disk drive, and various input switches such as a power switch and a suspend switch. A low speed serial bus 162, which generally is a bus with only one data signal, may provide an additional connection between the I/O controller 160 and South bridge 168. The I/O controller typically comprises an ISA bus interface (not specifically shown) and transmit and receive registers (not specifically shown) for exchanging data with the South bridge 168 over the serial bus.

The I/O controller 160 generally has the capability to handle power management functions such as reducing or terminating power to components such as the floppy drive (not shown), blocking the clock signals that drive components such as the bridge devices and CPU 112, and initiating sleep mode in the peripheral buses. The I/O controller 160 further asserts System Management Interrupt (SMI) signals to various devices such as the CPU 112, North bridge 120, and South bridge 168 to indicate special conditions pertaining to input/output activities such as sleep mode. The I/O controller 160 typically incorporates a counter or a Real Time Clock (RTC) to track the activities of certain components such as the hard drive and the PCI bus 125, and may induce a sleep mode or reduced power mode after a predetermined time of inactivity. The I/O controller may also place the computer system into a low-power mode, in which the power to all devices except the I/O controller 160 itself shuts off completely. Although the I/O controller 160 initiates many of the power functions, the I/O controller 160 typically acts according to instructions from the South bridge logic 168.

According to the preferred embodiment, a multi-bay configuration 172 couples to the IDE bus 164 and to the I/O controller 160. The multi-bay configuration 172 preferably includes three independent bays connected in any master/slave, primary/secondary configuration supporting hot-plugging of IDE devices in the bays. As one skilled in the art will understand, various IDE devices are available including CD ROM drives, floppy drives, tape drives, and the like. The USB 148 supports various peripherals, especially video peripherals such as video cameras for teleconferencing purposes. In addition to the buses discussed above, the South bridge 168 also preferably connects to interrupt signal lines, power management signal lines, and serial bus 162.

Figure 2:
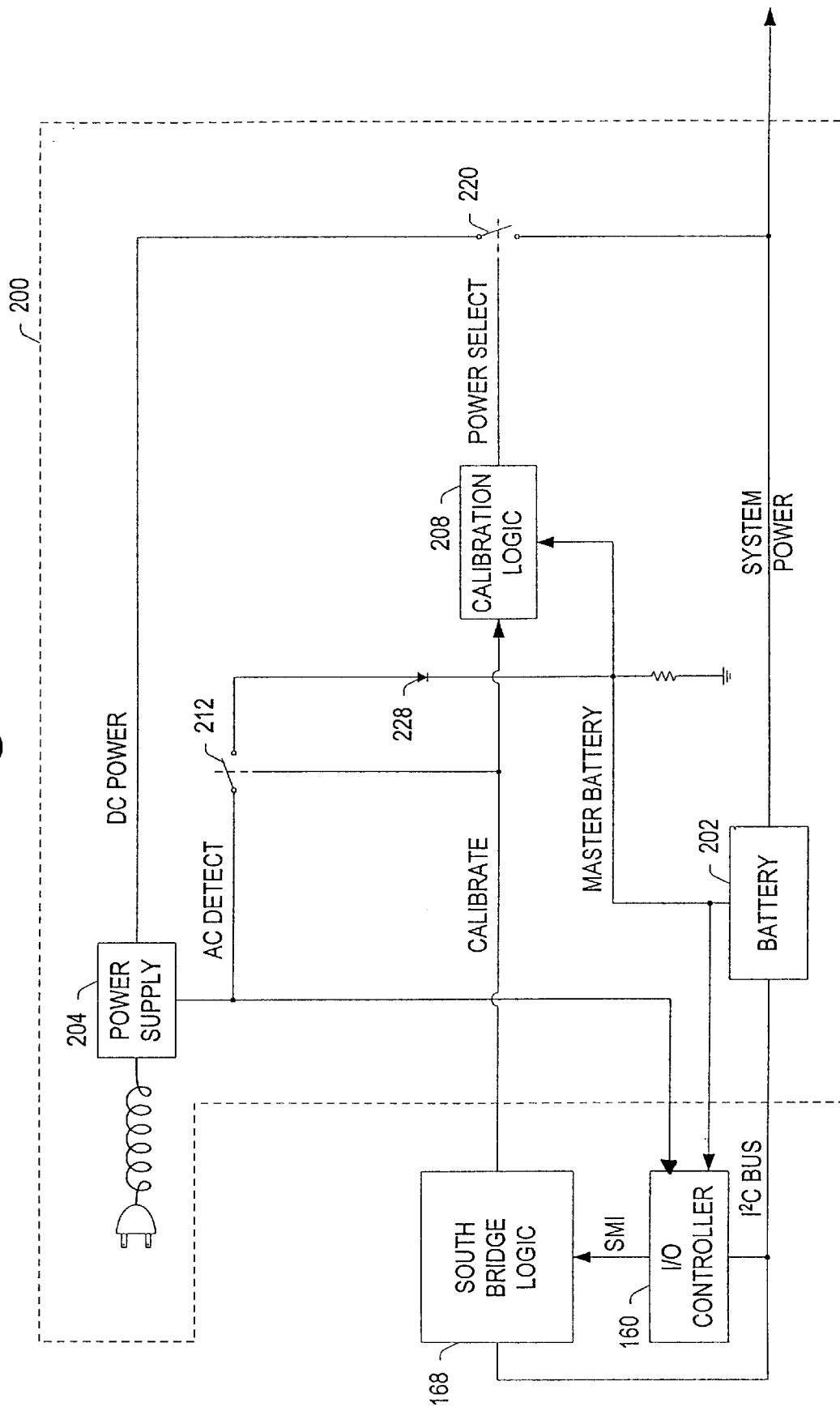
FIG. 2 illustrates a power subsystem for the computer of FIG. 1, including a calibration logic.

FIG. 2 illustrates the preferred embodiment of a power subsystem for supplying direct current (DC) power to the individual components and buses in computer system 100. The power subsystem 200 generally comprises an internal power supply 204, a rechargeable battery 202, and a calibration logic device 208 interconnected by various switches and other discrete components. The power supply 204 preferably resides within the computer chassis and converts alternating current (AC) into a direct current power signal, labeled as "DC power" in FIG. 2. The DC power rail preferably carries approximately 18 volts DC, although other line voltages are acceptable. The power supply 204 also generates an AC detect signal that, when asserted, indicates that the power supply 204 is coupled to an AC power source (e.g., a wall outlet) and is supplying DC current through the DC power line. The battery 202 generates a system power signal that supplies direct current to the computer 100. For computer systems which operate from an external power supply and thus receive direct current instead of alternating current at the chassis, or for internal power supplies which do not provide an AC detect signal, a separate AC detect circuit may be used to detect the presence of input power received from the external power supply in order to provide the AC detect signal.

The battery also provides a master battery signal to the calibration logic 208 and to the I/O controller 160. When asserted, the master battery signal indicates that the battery 202 is supplying power via the system power signal. Although the computer system 100 may include a plurality of batteries, preferably only one battery at a time supplies power to the system. Thus, only the one battery which is actively supplying system power asserts its master battery signal. The AC detect signal from the power supply 204 couples to the master battery signal by way of a switch 212 and a diode 228. Switch 212 couples to the AC detect signal at one terminal, and the other terminal of switch 212 couples to the anode terminal of the diode. The cathode terminal of the diode connects to the master battery signal. The switch 212 preferably comprises an n-channel MOSFET, although any suitable switching circuit may be employed. A pulldown resistor couples the master battery signal to ground, so that the master battery signal pulls low when not activated.

The South bridge logic 168 provides a calibrate signal to select the position of switch 212. Switch 212 opens when the calibrate signal is asserted high and closes when the calibrate signal is pulled low. If switch 212 is closed, then the diode 228 behaves similarly to an OR gate. If the master battery signal goes low, indicating that the battery 202 is not supplying power, then the diode 228 will permit the AC detect signal, if activated, to drive the master battery signal high. Only if neither the battery 202 asserts the master battery signal nor the power supply 204 asserts the AC detect signal will the master battery signal become deasserted. If switch 212 is open, then the master battery signal is not affected by the state of the AC detect signal.

The calibration logic 208 also receives the calibrate signal from the South bridge. Based on the states of the calibrate and master battery signals, the calibration logic 208 generates a power select signal that couples or decouples the DC power and system power signals, using a switch 220. The power select signal preferably is active high, and switch 220 preferably closes when the power select signal is deasserted low, connecting the DC power signal to the system power signal. Otherwise, if the power select signal is asserted high, the switch 220 keeps the DC power and system power signals disconnected. Switch 220 preferably comprises a p-channel MOSFET, although any suitable switching circuit may be used.

As shown in FIG. 2, the battery 202 further couples to the I/O controller 160 via an I²C Optionally, the South bridge 168 may couple to the I²C bus as well, as shown in FIG. 2. The I²C bus is a dual line, multidrop serial bus developed by Philips Semiconductors and comprises a clock line and one data line. The devices connected to the I²C bus can act as either master or slave devices, and each device is software addressable by a unique address. Master devices can operate as transmitters, receivers, or combination transmitter/receivers to initiate 8 bit data transfers between devices on the bus. The I²C utilizes collision detection and arbitration to prevent data corruption if two or more masters simultaneously transfer data. In a preferred embodiment, the I/O controller 160 acts as sole master of the I²C bus to initiate data transfers. The South bridge 168 and/or battery may act as bus masters if desired, however. The South bridge logic 168 and/or battery 202 preferably are capable of holding the bus data signal low for a period of time, to alert the I/O controller 160 to changes in operating conditions.

The battery 202 preferably comprises a lithium ion (LiIon) rechargeable storage cell but alternatively can be any desired rechargeable battery, such as a nickel metal hydride (NiMH) type. The battery 202 preferably operates in at least three standard operating modes, including charging mode and discharging mode. In the charging mode, the battery 202 receives current from the system power signal, which replenishes the charge storage cell. The battery preferably exits the charging mode when the storage cell is fully charged, to prevent damage from overcharging. In the discharging mode, the battery 202 supplies current to the system via the system power signal. As explained above, the battery 202 asserts the master battery signal to indicate that it is supplying current. In an idle mode, the battery neither charges nor discharges.

The battery 202 preferably includes a microprocessor or controller (not shown) for controlling battery operation, along with associated logic circuitry such as an electrically erasable programmable read only memory (EEPROM) and an I²C interface, for example. Various registers which indicate operating modes and characteristics of the battery, either in the microprocessor or in associated logic circuitry, include a capacity register, a percent charge register, a battery full register, an operation status register, a current/voltage register, a battery dead register, and a ship mode register. The capacity register indicates the charge capacity of the battery, or the maximum amount of charge the battery can store. The percent charge register indicates the amount of charge actually stored in the battery, measured as a percentage of the capacity, and the battery full register is set if the percent charge is at 100%. The operation status register indicates the operating condition of the battery. Operating conditions include, for example, battery charging, battery supplying power, and battery damaged. The current/voltage register indicates the levels of current and/or voltage both supplied by and received by the battery, via the system power signal. The battery dead and ship mode register each comprise one bit. The battery dead register indicates that the battery is unusable, while the ship mode register bit, when set, prevents the battery from discharging, such as during shipping or long term storage. The ship mode bit should be reset before use, or the battery will not supply power. The register values may be read or written via the I²C bus. Note that these registers merely represent one possible configuration of registers. Additional register configurations are envisioned, as well.

To set and maintain the percentage charge register, the battery preferably includes an internal battery monitor (not shown). The internal battery monitor determines the amount of charge that leaves the battery by measuring the battery output current over a period of time. The battery monitor resets to 100% when the battery full bit is set, indicating that the battery is fully charged. As the battery discharges, the battery monitor updates the percent charge register. During normal operation, the South bridge 168 polls the percent charge register to determine the of charge remaining in the battery.

In a preferred embodiment, and in accordance with normal battery convention, the battery 202 deasserts the master battery signal when the storage cell is nearly discharged. In a typical LiIon battery, for instance, the master battery signal drops when approximately 4 seconds of charge time remain in the battery. Note that 4 seconds only represents a time estimate, however, and that the master battery signal may drop a number of seconds sooner or later than 4 seconds before total discharge. Thus, the battery will supply current even after bringing the master battery low, but only for a short time. Because the total operating time for the battery is fairly long compared to the amount of time the battery can operate after dropping the master battery O signal, the percent charge register indicates approximately 0% charge when the master battery signal drops.

As explained above, many power control algorithms, which may be executed either using the Advanced Power Management (APM) system or the Advanced Configuration and Power Interface (ACPI), typically force the computer to save the contents of memory 104 and shut down if the percent charge in the battery drops below a predetermined threshold and if the power supply is not supplying power (as indicated by the AC detect signal). Because the exact value of the percent charge was impossible to determine accurately in prior art systems, the shut down charge threshold had to be set artificially high to ensure that the battery did not discharge unexpectedly. The artificially high threshold, however, prevented the batteries from fully charging due to the memory effect, thus perpetuating the inaccuracy in the battery monitor and strengthening the need for the battery threshold. Prior art computers, however, would not discharge the battery when plugged into an AC source and thus would not shut down if the battery were low.

In contrast, the power subsystem 200 of FIG. 2 implements a calibration procedure that allows the battery to fully discharge without the computer shutting down prematurely, as long as the power supply is connected to an alternating current source and providing DC power via the DC power line. First, the battery 202 is charged. Next, the DC power signal is decoupled from the system power line at switch 220, allowing the battery 202 to discharge into the computer 100. While the battery discharges, the power supply 204 continues to function normally, including asserting the AC detect line. Thus, to power management software, the power supply 204 appears to be providing the system power. Accordingly, power management software does not force the computer 100 to shut down when the battery charge falls below the auto shut down threshold. When the battery 200 is nearly discharged, the master battery line will drop. The calibration logic 208 then closes switch 220 to couple the power supply 204 back onto the system power line before the battery completely discharges, thus avoiding total power failure. As explained above, conventional batteries typically have approximately 4 seconds of power left after dropping the master battery line. Thus, the calibration logic 208 preferably closes the switch 220 within approximately 4 seconds after the master battery drops. Because the battery 202 discharges to a charge level close to 0%, the battery can be recharged extremely close to the actual charge capacity. Thereafter, the charge level indicated by the battery monitor will be extremely close to the true value.

Because the accuracy of the battery monitor increases after calibration, power management software can lower the charge threshold at which the computer 100 shuts down when running on battery power, thereby lengthening the amount of time a user can operate the computer. Moreover, because the power supply 204 is coupled to the system power line before the battery completely discharges, the computer user can operate the computer 100 normally during the calibration procedure without risking data loss when the battery runs down. In an alternative embodiment, the computer system 100 need not reconnect the power supply 204 to the system power line when the master battery signal drops, if another power source is available to maintain computer operation. The calibration logic 208 could instruct another battery to begin powering the system when the battery under calibration drops the master battery signal. A backup battery, for instance, or a secondary battery, if multiple batteries are available within the system, could provide the backup power.

Figure 3:
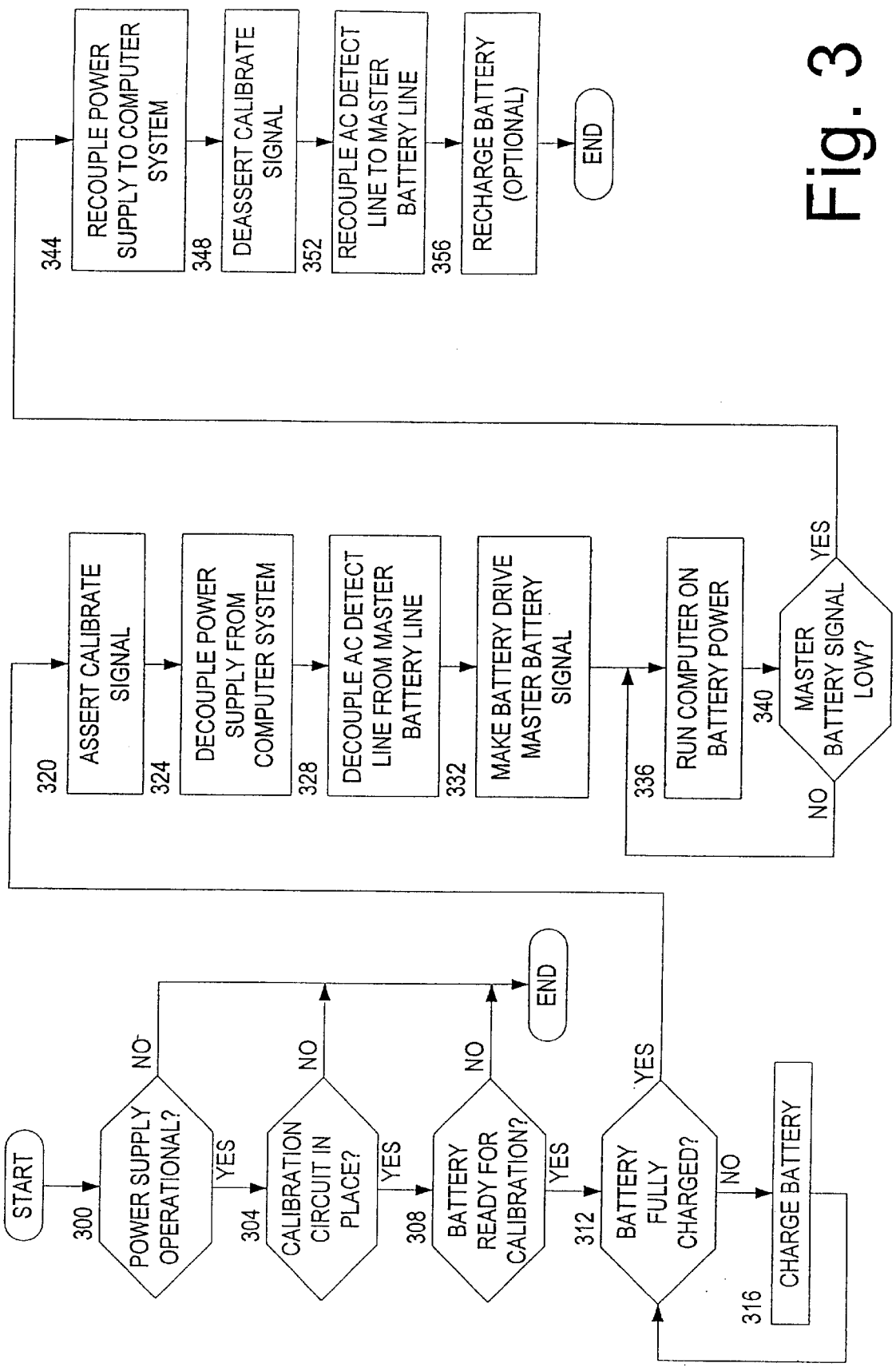
FIG. 3 illustrates the flowchart of a preferred embodiment of the procedure for automatic battery calibration.

FIG. 3 illustrates a flowchart of the calibration procedure. Referring to FIG. 2 in conjunction with FIG. 3, the power select line remains deasserted prior to calibration, holding switch 220 closed and thereby coupling the DC power and system power signals. The calibrate signal also remains low prior to calibration, holding switch 212 closed, coupling the AC detect line to the master battery line through diode 228. Prior to calibration, the power supply 204 supplies current to the computer 100 via the system power line, and the batter 202 is idle. Thus, the AC-detect line holds the master battery signal high.

Before calibrating the battery 202, the I/O controller 160 verifies that the power supply 204 is operational (block 300), that the calibration logic 208 and any other calibration circuits are present in the system (block 304), and that the battery 202 is ready for calibration (block 308). If the power supply 204 is not operational (e.g., if the computer is not plugged into a wall outlet), then the calibration procedure does not commence. Similarly, if the calibration circuitry is not in place, or if the battery 202 is not ready for calibration, then the calibration procedure fails to execute. Otherwise, the calibration procedure continues with block 312.

Until the battery 202 is fully charged (block 312), the calibration procedure charges the battery (block 316). To determine whether or not the battery is fully charged, the I/O controller 160 reads the battery full register in the battery. If the battery full register is not set, then the battery is not fully charged. Accordingly, the I/O controller 160 sends a charge command to the battery 202 over the I²C bus. The battery 202 then receives charging current from the power supply 204, and the I/O controller 160 continues to poll the battery 202 until the battery full register is set. Alternatively, the I/O controller 160 may read the percent charge register to determine when the battery charge level reaches 100%. When the battery 202 charges completely, the I/O controller 160 sends a command to the battery 202 via the I²C bus to stop the battery from charging.

Next, in block 320, South bridge 168 asserts the calibrate signal. In response, the calibration logic 208 asserts the power select signal, opening switch 220. Accordingly, the DC power line is decoupled from the system power line, so that the computer 100 runs solely on current from the battery 202. Although the computer is running without power from the power supply 204, power management software does not recognize that the AC power has been terminated, since the power supply 204 continues to provide the AC detect signal to the I/O controller 160. Asserting the calibrate signal also opens switch 212, decoupling the AC detect signal from the master battery signal (block 328). Because no device is driving the master battery signal, a pull down resistor forces the master battery line to ground. The I/O controller 160 detects the change in state of the master battery signal and instructs the battery 202 to begin driving the system power line (block 332). Accordingly, the battery 202 raises the master battery line and begins supplying power to operate the computer 100 in block 336.

Note that the calibration logic 208 could reside at any desired location within the computer system 100. If the calibration logic 208 resides within the South bridge 168, for example, then the South bridge 168 receives the master battery signal and asserts the power select signal directly to switch 220. The battery 202 also could implement the calibration logic 208 by asserting the power select signal directly. If the battery 202 comprises the calibration logic 208, then a special purpose register may be used which, when set by the South bridge 168, initiates battery calibration, in lieu of asserting a calibrate signal. Further, if the battery 202 provides the power select signal, a pulldown resistor preferably connects between the power select signal and ground, so that the power select signal pulls to ground if the battery is removed.

While the computer 100 operates under battery power, discharging the battery, the computer may be used normally if desired. When the battery discharge level reaches the point at which the computer 100 normally shuts down, the computer may continue to operate, since the AC detect line is asserted to the I/O controller 160. Note that the power supply 204 must remain plugged into an AC source and assert the AC detect signal. If the AC detect signal is released, indicating that the power supply 204 is not driving the DC power line, then the South bridge 168 preferably terminates the calibration procedure. The power management software then operates the computer in normal battery mode, and the computer 100 may shut down if the battery level is below the shut down threshold.

As long as the AC detect line remains high, the battery continues to discharge in block 336, until the battery 202 drops the master battery signal, indicating approximately 4 seconds before complete discharge. When the master battery signal falls (block 340), the calibration logic 208 deasserts the power select line to close switch 220. Accordingly, the DC power line couples to the system power line, and the computer 100 begins operating on current from the power supply 204. The computer 100 thus avoids shut down by reconnecting the AC power before the battery fails. The battery 202, however, nearly completely discharges, avoiding the memory effect and allowing the battery 202 to be fully recharged.

In order to terminate the calibration procedure, the I/O controller 160 transmits a system management interrupt (SMI) to the South bridge 168 when the master battery signal falls. In response to the SMI, the South bridge 168 deasserts the calibrate signal in block 348, closing switch 212, and thereby coupling the AC detect signal to the master battery signal (block 352). The AC detect signal thus drives the master battery signal high. If desired, the battery 202 may be recharged in block 356. Because the battery 202 can be fully recharged after calibration, the charge level indicated by the battery's charge monitor will be highly accurate.

Figure 4:
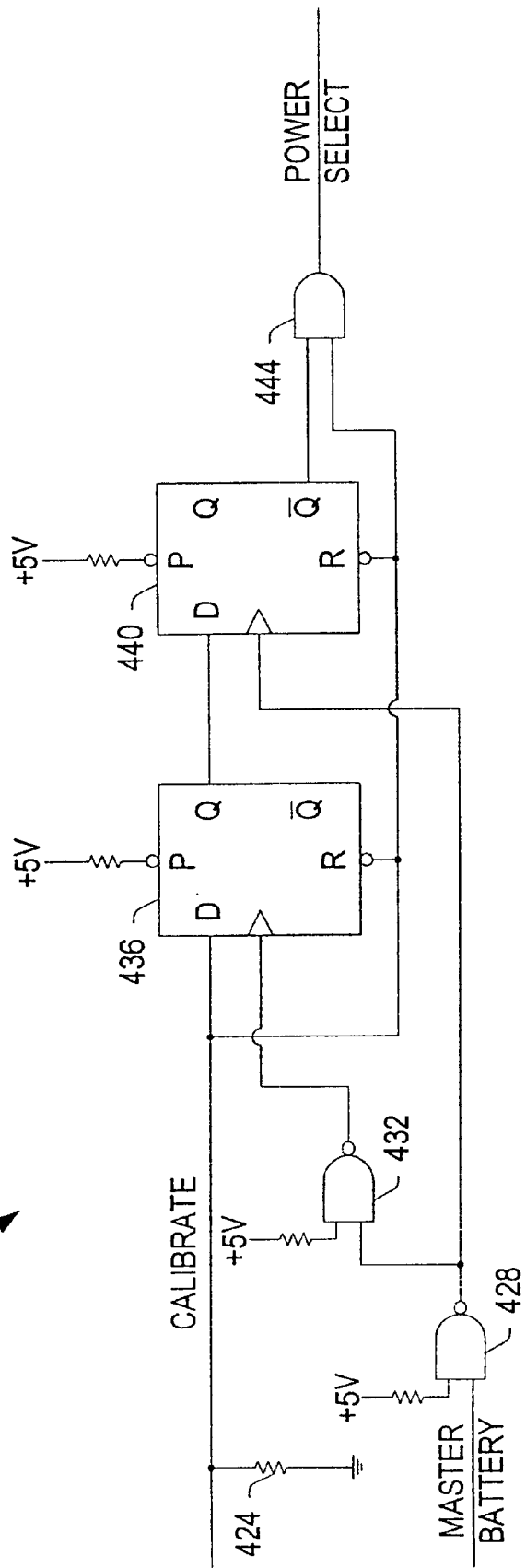
FIG. 4 illustrates a preferred embodiment of the calibration logic of FIG. 2.

FIG. 4 illustrates the block diagram of a preferred embodiment of the calibration logic 208, which comprises a state machine to control the power select signal based on the states of the calibrate and master battery signals. The state machine comprises a pair of cascaded D flip flops 436 and 440, coupled to a variety of combinatorial logic gates. The first D flip flop 436 receives the calibrate signal at its D input terminal, and couples to ground via a pullup resistor 424. The noninverting output terminal (Q) of the first flip flop 436 drives the D input terminal of the second flip flop 440. The calibrate signal, along with the inverting output terminal ($\overline{Q}$) of the second flip flop, feed an AND gate 444, which outputs the power select signal. The calibrate signal also couples to the reset pins (R) of the flip flops 436 and 440, which are active low. Thus, the flip flops 436 and 440 reset to logic 0's asynchronously if the calibrate signal is deasserted. Preferably, the preset pins (P) of the flip flops 436 and 440, which are active low, are tied high to prevent asynchronous preset.

A pair of NAND gates 428 and 432 generate the clock signals which are used to synchronize the operation of the flip flops 436 and 440. The NAND gate 428 receives the master battery signal at one terminal and is tied high at the other terminal. One terminal of NAND gate 432 is tied high, while the other terminal receives the output signal from the first NAND gate 428. The NAND gate 432 drives the clock input terminal of the first flip flop 436, and NAND gate 428 clocks the second flip flop 440. The flip flops 436 and 440 preferably trigger on the rising edges of the clock input signals. Thus, the flip flop 436 stores the value of its D input signal when the output signal from NAND gate 432 changes from low to high. Similarly, the flip flop 440 stores the value of its D input signal when the output signal from NAND gate 428 changes from low to high. Note that the NAND gates 428 and 432 are configured as inverters. Accordingly, conventional inverters, or any other logic devices capable of inverting an input signal (e.g., NOR gates), may be used in place of the NAND gates 428 and 432. The power select signal preferably is active high, meaning that the power select signal, when asserted, represents a high logic level. Thus, switch 220 (of FIG. 2) closes when the power select signal is deasserted low.

FIG. 5 illustrates a timing diagram of the signals in FIG. 4 during the calibration procedure. FIG. 5 will be discussed in conjunction with FIGS. 2–4. Note that the numerals in FIG. 5 which match flowchart blocks in FIG. 3 correspond to those blocks. Times 320, 324, 328, 332, 340, 344, 348, and 352 in FIG. 5, for example, correspond to blocks 320, 324, 328, 332, 340, 344, 348, and 352 in FIG. 3. Note that the timing diagram of FIG. 5 is not drawn to scale in time.

During normal computer operation the calibrate signal remains low, so that the D flip flops 436 and 440 remain in a constant reset state. Thus, the flip flop 436 feeds a logic 0 value to flip flop 440 (via the noninverting output terminal), and flip flop 440 feeds a logic 1 value to the AND gate 444 (via the inverting output terminal). The low calibrate signal forces AND gate 444 to hold the power select signal low (deasserted), keeping switch 220 closed. Assuming that the power supply 204 is functioning prior to the test, the AC detect line remains high, pulling the master battery signal high.

When the South bridge 168 asserts the calibrate signal (time 340) to initiate the calibration procedure, the master battery signal goes low (time 328), as explained above. When the master battery signal falls at time 328, the clock input terminal of flip flop 440 receives a rising edge. Because the noninverting output signal from flip flop 436 is feeding a logic 0 into the D input terminal of flip flop 440, however, flip flop 440 does not change state. Since the inverting output signal from flip flop 440 remains high before and after asserting the calibrate signal, the power select signal goes high, opening switch 220 and decoupling the power supply 204 from the system power line (time 324).

Flip flop 436 receives a falling edge clock signal and does not change state when the master battery signal falls. When battery 202 subsequently asserts the master battery signal at time 332, however, flip flop 436 receives a rising edge clock signal. Because the calibrate signal is high, the flip flop 436 stores a logic 1 value (time 532), which is presented on its noninverting output line to flip flop 440. Flip flop 440 remains at logic 0, however, since asserting the master battery signal delivers a falling edge clock signal to flip flop 440. Thus, neither the calibrate signal nor flip flop 440 changes value at time 332, and the power select signal remains asserted.

Because the power supply 204 is decoupled from the system power line after time 332, the computer drains the battery 202 during normal operation. The AC detect signal remains asserted to the I/O controller 160, however, indicating to power control software that the computer 100 is receiving power from the power supply 204. When battery 202 discharges and drops the master battery signal (time 340), NAND gate 428 supplies a rising clock edge to flip flop 440. Note that the master battery signal also will drop if the battery 202 is removed from the computer 100 during calibration. When the master battery signal falls low, flip flop 440 stores the logic 1 value from the noninverting terminal of flip flop 436 (time 540), thereby driving AND gate 444 with a logic 0 value. Accordingly, AND gate 444 pulls the power select signal low (time 344), closing switch 220 to reconnect the power supply 204 to the system power line. The computer system 100 thus avoids power failure.

When the I/O controller 160 detects the master battery signal low at time 340, an SMI is transmitted to the South bridge 168, which deasserts the calibrate signal at time 348. Deasserting the calibrate signal resets flip flops 436 and 440 and forces the power select to remain deasserted low. Deasserting the calibrate signal also closes switch 212 (as explained in block 352 of FIG. 3), causing the AC detect signal to pull the master battery signal high. Accordingly, the signals shown in FIG. 5 return to the same state as before the calibration procedure.

Accordingly, the computer system disclosed herein executes an automatic calibration procedure that improves the accuracy of the battery's internal charge monitor. As a result, power management software can allow the battery to drain further before shutting down, thus increasing total operating time for the user. In addition, calibration occurs during normal computer operation, thus permitting a user to operate the computer without risking power failure when the battery discharges. Further, the calibration procedure is robust in that the computer returns to normal operation if the AC power or the battery is removed.

Numerous variations and modifications will become apparent to those skilled in the art once the above disclosure is fully appreciated. Some of the many alternative embodiments include, for example, a rechargeable battery capable of self-calibration by coupling or decoupling itself from an external charging current, and a battery calibration device capable of receiving a battery and automatically discharging the battery into a load, such as a resistor or transistor. In another embodiment, the computer is permitted to shut down without reconnecting power supply after the battery drains, if the possibility of data loss is acceptable or if data loss is preventable through other means than reinstating the power supply current. It is intended that the following claims be interpreted to embrace all such variations and modifications.

We claim:

1. A computer system, comprising:

a rechargeable battery that stores electric charge, said battery generating a system power line that supplies DC power to said computer system;

a processor coupled to said system power line and that executes program instructions;

a memory array coupled to said processor and that stores program instructions and data values, said memory array receiving power from said system power line;

an input control device operatively coupled to said processor;

a power supply that generates a supply voltage capable of charging said battery and of supplying DC power;

a first switch coupling the system power line of said battery to the supply voltage from said power supply;

a calibration controller coupled to said battery and that selects the state of said first switch, wherein said calibration controller calibrates said battery by opening said first switch to decouple said battery from said supply voltage, waiting for said battery to discharge after opening said first switch, and then closing said first switch when said battery is nearly drained; and a power management logic that provides a calibration signal to said calibration controller, and wherein said calibration controller opens said first switch if said power management logic asserts the calibration signal;

wherein said calibration controller keeps said first switch closed if the calibration signal is deasserted;

wherein said power supply asserts an AC detect signal to said power management logic while said battery discharges, the AC detect signal indicating that said power supply is supplying electric power to the computer system;

wherein said processor is configured to run a software power management program that maintains normal computer operation as long as the AC detect signal remains asserted, even if the battery has discharges below a predetermined level.

2. The computer system of claim 1, wherein said battery asserts a master battery signal while discharging and deasserts the master battery signal just before said battery is nearly drained.

3. The computer system of claim 2, wherein said calibration controller closes said first switch to couple the supply voltage of said power supply to the system power line of said battery, if said battery deasserts the master battery signal while discharging.

4. The computer system of claim 3, wherein said calibration controller comprises a state machine clocked by the master battery signal.

5. The computer system of claim 1, wherein said calibration controller asynchronously opens said first switch if said power management logic asserts the calibration signal.

6. The computer system of claim 1, wherein said power management logic comprises a bus bridge.

7. The computer system of claim 1, wherein said battery asserts a master battery signal while discharging and deasserts the master battery signal just before said battery is nearly drained, and further including a second switch that couples the AC detect signal to the master battery signal, wherein said second switch opens if the calibration signal is asserted.

8. The computer system of claim 7, wherein said power management logic includes an I/O controller coupled to said battery and said power management logic, wherein said I/O controller transmits an interrupt if said battery deasserts the master battery signal.

9. The computer system of claim 1, wherein said power management logic deasserts the calibration signal in response to the interrupt.

10. A method of calibrating a rechargeable battery for a computer system executing power management software, comprising:

disconnecting a power supply from the computer, such that the power supply does not provide power to the computer;

indicating to the power management software that the power supply is supplying power to the computer, even after disconnecting the power supply;

providing power to the computer from the battery, until the battery charge falls below a predetermined level; and after the battery charge falls below the predetermined level but before the battery completely drains, connecting the power supply to the computer such that the power supply provides power to the computer.

11. The method of claim 10, wherein connecting and disconnecting the power supply from the computer is accomplished through a switch between the power supply and the battery.

12. The method of claim 11, wherein indicating that the power supply is supplying power to the computer comprises transmitting an AC detect signal from the power supply while the power supply is receiving input power.

13. The method of claim 12, wherein the power supply comprises an internal power supply.

14. The method of claim 10, comprising monitoring a status signal from the battery to determine when the battery charge falls below the predetermined level.

15. The method of claim 14, wherein indicating that the power supply is supplying power to the computer comprises transmitting an AC detect signal from the power supply while the power supply is receiving input power.

16. The method of claim 15, including coupling the status signal to the AC detect signal unless the power supply is supplying power to the computer.

17. The method of claim 14, including transmitting an interrupt when the status signal indicates that the battery charge is below the predetermined level.

18. The method of claim 17, wherein connecting the power supply to the computer comprises executing an interrupt service routine in response to the interrupt.

19. The method of claim 10, wherein connecting the power supply to the computer occurs when the battery has approximately 4 seconds of operating time left before complete discharge.

* * * * *

UNITED STATES PATENT AND TRADEMARK OFFICE
CERTIFICATE OF CORRECTION

PATENT NO. : 6,463,545 B1  
DATED : October 8, 2002  
INVENTOR(S) : Andrew J. Fisher et al.

It is certified that error appears in the above-identified patent and that said Letters Patent is hereby corrected as shown below:

<u>Column 15,</u>  
Line 50, delete "discharges" and insert -- discharged --.

<u>Column 16,</u>  
Line 15, delete "claim 1" and insert -- claim 8 --.

Signed and Sealed this

Fourth Day of April, 2006

JON W. DUDAS  
*Director of the United States Patent and Trademark Office*